US012230120B2

(12) United States Patent
Maheshwari et al.

(10) Patent No.: US 12,230,120 B2
(45) **Date of Patent: *Feb. 18, 2025**

(54) SMART ENVIRONMENTAL PROBE FOR DEFENSIBLE SPACE MONITORING

(71) Applicant: Accenture Global Solutions Limited, Dublin (IE)

(72) Inventors: Aditi Maheshwari, San Francisco, CA (US); Mark Benjamin Greenspan, San Francisco, CA (US); Lavinia Andreea Danielescu, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,712

(22) Filed: Mar. 23, 2023

(65) Prior Publication Data

US 2023/0252882 A1 Aug. 10, 2023

Related U.S. Application Data

(63) Continuation of application No. 17/348,165, filed on Jun. 15, 2021, now Pat. No. 11,626,005.

(Continued)

(51) Int. Cl.
*G08B 25/00* (2006.01)
*G08B 17/00* (2006.01)

(52) U.S. Cl.
CPC ......... *G08B 25/006* (2013.01); *G08B 17/005* (2013.01)

(58) Field of Classification Search
CPC ..... G08B 17/005; G08B 25/006; H04W 4/90; H04L 67/12

(Continued)

(56) References Cited

U.S. PATENT DOCUMENTS 11,626,005 B2 * 4/2023 Maheshwari ........ G08B 17/005 455/404.1
2006/0007008 A1 1/2006 Kates (Continued)

FOREIGN PATENT DOCUMENTS

CN 103326739 A 9/2013
WO WO-2016/130804 A1 8/2016

OTHER PUBLICATIONS

European Patent Office, Communication, Extended European Search Report issued for Patent Application No. 21179918.4, dated Nov. 10, 2021, 10 pages.

(Continued)

*Primary Examiner* — Maria El-Zoobi

(57) ABSTRACT

Aspects of the present disclosure provide an environmental probe configured to be at least partially inserted into the ground at a location and to provide defensible space monitoring and maintenance for a home or other structure. The environmental probe may include one or more environmental sensors configured to perform various environmental measurements to generate environmental measurement data. The environmental probe (e.g., a processor of the environmental probe) may compare the environmental measurement data to one or more thresholds to determine an alert state associated with the location. The environmental probe may include one or more wireless interfaces configured to enable communication with a remote device, such as a smart hub device or other environmental probes. The environmental probe may transmit an indicator of the alert state to the remote device to enable performance of one or more operations based on the alert state.

20 Claims, 7 Drawing Sheets

Related U.S. Application Data

(60) Provisional application No. 63/040,501, filed on Jun. 17, 2020.

(58) Field of Classification Search
USPC ........................................................ 455/404.1
See application file for complete search history.

(56) References Cited

U.S. PATENT DOCUMENTS

| | | | | |
|---|---|---|---|---|
| 2007/0208517 | A1* | 9/2007 | Glenn | A01G 7/00<br>702/19 |
| 2007/0241988 | A1 | 10/2007 | Zerphy et al. | |
| 2008/0018519 | A1 | 1/2008 | Berg et al. | |
| 2012/0112901 | A1 | 5/2012 | Chasko | |
| 2017/0045487 | A1 | 2/2017 | Bauer-Reich et al. | |
| 2017/0330447 | A1 | 11/2017 | Mehta et al. | |
| 2018/0336771 | A1* | 11/2018 | Linn | G08B 17/005 |
| 2019/0277749 | A1 | 9/2019 | Rushing et al. | |
| 2020/0090515 | A1 | 3/2020 | Torres | |

OTHER PUBLICATIONS

Government of India, Intellectual Property Patent Office, Examination Report issued for Patent Application No. 202144026785, dated Mar. 11, 2022, 5 pages.

* cited by examiner

SMART ENVIRONMENTAL PROBE FOR DEFENSIBLE SPACE MONITORING

CROSS-REFERENCE TO RELATED APPLICATIONS

The present application is a continuation of U.S. patent application Ser. No. 17/348,165 filed Jun. 15, 2021 and entitled "SMART ENVIRONMENTAL PROBE FOR DEFENSIBLE SPACE MONITORING," which claims the benefit of priority from U.S. Provisional Application No. 63/040,501 filed Jun. 17, 2020 and entitled "SMART ENVIRONMENTAL PROBE FOR DEFENSIBLE SPACE MONITORING," the contents of which are both incorporated herein by reference in their entirety.

TECHNICAL FIELD

The present invention relates generally to environmental probes and more specifically to an environmental probe for defensible space monitoring and maintenance.

BACKGROUND

Wildfires pose a significant threat in terms of potential property damage, injury, and loss of life. Many regions of the United States, and of the world, have increased risks of wildfires due to dry climates or droughts. To reduce the likelihood of wildfires spreading to buildings or other structures, various regulatory and government agencies have propagated rules for maintaining "defensible spaces" around buildings. A defensible space may refer to a natural and/or landscaped area around a structure that is maintained and designed to reduce fire danger. As an example, California law requires that homeowners in the state responsibility area (SRA) clear out flammable material such as brush or vegetation around their buildings up to 100 feet (or the property line) to create a defensible space buffer. To combat wildfires, agencies may use satellites to monitor temperatures, wind speeds, and ground measurements to predict or locate wildfires. However, there is limited or no technology available for monitoring wildfires and maintaining defensible spaces at a home or business.

SUMMARY

The present application discloses systems, methods, and computer-readable storage media for monitoring defensible spaces, such as for wildfires or maintenance of the defensible spaces. In aspects, an environmental probe may have a narrow, cylindrical or rectangular shape and may be configured to be at least partially inserted into the ground at a location, such as nearby a house, a business, or some other type of building or structure, to provide wildfire monitoring and defensible space maintenance. The environmental probe may include multiple integrated components to support defensible space monitoring operations, such as one or more environmental sensors, one or more wireless interfaces, a memory, and a processor. In some implementations, the one or more environmental sensors may include an air temperature sensor, a gas sensor, a soil surface temperature sensor, a moisture sensor, a soil pH sensor, or a combination thereof, and the one or more environmental sensors may be configured to generate environmental measurement data that includes air temperatures, gas or particulate levels, soil surface temperatures, soil moisture levels, soil pH levels, or a combination thereof. The one or more wireless interfaces may be configured to enable wireless communication between the environmental probe and another device, such as a smart device hub, one or more additional environmental probes, or a combination thereof. As one example, the one or more wireless interfaces may include a long range (LoRa) interface, a Wi-Fi interface, a Bluetooth interface, a Bluetooth Low Energy (BLE) interface, or a Zigbee interface, as non-limiting examples, configured to enable communication with a smart device hub (or other remote device), the additional environmental probes, an environmental probe hub device, or a combination thereof. In some implementations, multiple environmental probes may form a mesh network for sharing environmental measurement data and conveying that data back to a hub or other device.

The processor may be configured to determine an alert state at the location (e.g., the residence or other structure). For example, the processor may determine an alert state, which may include an alert indicating a detected or predicted wildfire or another condition associated with the defensible space that may require an action to remedy, and a non-alert state, based on a comparison of the environmental measurement data to one or more thresholds, such as an air temperature increase rate threshold, a gas or particulate level threshold, a soil surface temperature increase rate threshold, a soil moisture threshold, a soil pH level threshold, or a combination thereof, as non-limiting examples. The processor may also be configured to initiate transmission of an indicator of the alert state to the smart hub device (or other Internet-of-Things (IoT) hub device) that is configured to perform one or more operations based on the indicator. For example, the alert state may indicate detection of a wildfire, detection of a dry condition (e.g., the moisture level of the soil fails to satisfy a threshold), an over-watered condition (e.g., the moisture level satisfies a second threshold), or other conditions, and the operations may include initiating an alarm at the residence (e.g., an audio alarm, a visual alarm, etc.), transmitting an alarm message to a mobile device, initiating a component of a sprinkler system, deactivating the sprinkler system, transmitting a status message to the mobile device or another device, transmitting an alert to a fire department or other entity, transmitting an alert (or the environmental measurement data) to an insurance company server (which may result in a discounted insurance rate for the owner of the residence), or a combination thereof. In this manner, the environmental probes of the present disclosure may be integrated in a smart home or IoT system to enable wildfire monitoring and response at a residence or other structure.

In some implementations, the processor may be configured to transmit indications of non-alert states, such as state information, to the smart hub device or other remote device. The state information may indicate air quality index (AQI) measurements, measurements associated with the soil surrounding the environmental probe (e.g., moisture levels, soil pH levels, and the like), other measurements, or a combination thereof. Transmission of the state information may enable the environmental probe to support non-fire related operations, such as AQI monitoring or lawn and garden maintenance, as non-limiting examples. Additionally or alternatively, the state information may indicate a state of the environmental probe, such as a low batter indicator, an error state indicator, or a no remaining weedicide indicator, as non-limiting examples. Transmitting such state information to the smart device hub may enable generation of a message to a user to perform an action to remedy the state of the environmental probe, such as replacing a battery, adding more weedicide, or performing a troubleshooting action.

In some implementations, the environmental probe is solar powered. For example, the environmental probe may include a solar panel configured to power the components of the environmental probe. Additionally or alternatively, the environmental probe may include a rechargeable battery or a removable battery (e.g., a replaceable battery), such as a lithium ion battery, configured to power the components of the environmental probe.

In some implementations, to support maintenance of a defensible space around the residence or other structure, the environmental probe may include a storage chamber configured to store a substance for dispersal to the area. For example, a hollow cavity within a portion of the environmental probe may be configured as a storage chamber to store weedicide for dispersal to the area to maintain the area as vegetation-free. In some implementations, the environmental probe may include a detachable nose cone that is attachable to the environmental probe below an opening of the storage chamber. The detachable nose cone may break off in the soil, dissolve away over time, and/or be screwed into the main body of the environmental probe. The detachable nose cone may be pointed at the bottom to enable easier insertion of the environmental probe into the ground. Additionally, the detachable nose cone may be formed from (or partially formed from) a dissolvable material, such as polyvinyl alcohol (PVA, PVOH, or PVAl), to enable dissolving of the detachable nose cone, or a portion thereof, and dispersal of the weedicide to the area around the environmental probe. The detachable nose cone may be thicker near the tip, to withstand shear force when inserted into the ground, and may have thin sidewalls nearer the top to enable quicker dissolving and dispersing of the weedicide. In some implementations, the weedicide may be encapsulated in water-rich hydrogels or other controlled-delivery formulations to prevent over-toxicity in the soil and to keep the soil hydrated.

In some implementations, the environmental probe may be configured with a storage chamber for storage of substances that promote plant growth in the surrounding soil under difficult growth conditions. For example, the storage chamber may store water retaining hydrogels, soil nutrients such as mycorrhiza, insect pathogenic nematodes, or a combination thereof, that are configured to maintain plant health and promote plant growth during droughts, infestations, or other difficult growth conditions. To further illustrate, the detachable nose cone, the side walls, or both, of the environmental probe may be formed from (or partially formed from) a dissolvable material to enable dissolving and dispersal of the substance stored within the storage chamber of the environmental probe into the surrounding soil. In some implementations, the substance may be encapsulated in water-absorbing hydrogels that absorb water when the soil is watered or during rain and release the water, and the substance, during dryer conditions. For example, the substance may include soil nutrients that, along with absorbed water, are released into the surrounding soil when the soil is dry to moisten the soil and promote plant growth.

Additionally or alternatively, one or more substance dispersal devices may be similarly configured to the environmental probe, such as including the storage chamber and the nose cone, but including fewer, or none, of the electronic components (e.g., the processor, the memory, the wireless interface, the sensors, etc.) of the environmental probe. For example, a substance dispersal device may have a substantially cylindrical shape that includes, within a cavity defined by outer walls, a storage chamber configured to store weedicide, hydration substances (e.g., in liquid or solid form), or the like, and a nose cone (e.g., detachable or shaped from the outer walls). The nose cone, the outer walls, or both, may be formed from a dissolvable material to enable dispersal of the substance stored in the storage chamber to the soil surrounding the substance dispersal device once the substance dispersal device is inserted into the ground. The substance dispersal device, and any electronics or other components included therein, may be formed from biodegradable material such that the substance dispersal device dissolves away over time without leaving remnants to be collected or to pollute the soil.

In some implementations, multiple environmental probes (or substance dispersal devices) may be placed at various distances from the residence or other structure to form a defensible space monitoring system. For example, the environmental probes may be manually inserted into the ground, pushed by or towed behind, or otherwise inserted by, aerators, or launched from a delivery vehicle (such as an aerial drone), at various positions. Environmental probes within a first zone (e.g., within 0-5 feet of the residence) or a second zone (e.g., within 6-30 feet of the residence) may include the weedicide and the detachable nose cone, and environmental probes within a third zone (e.g., 31-100 feed of the residence) may not include the weedicide and the detachable nose cone. The environmental probes may communicate via one or more network protocols, such as a Wi-Fi network protocol (e.g., an Institute of Electrical and Electronics Engineers (IEEE) 802.11 network protocol), a Bluetooth network protocol, a low-power network protocol, a Zigbee network protocol, a LoRa protocol, a cellular protocol, or another type of network protocol. In some implementations, the environmental probes may form a mesh network for communication of environmental measurement data. Environmental probes in the outer zones (e.g., the second zone or the third zone) may provide corresponding environmental measurement data to environmental probes in the first zone, for communication to the smart hub device via a Wi-Fi network or a LoRa network, as non-limiting examples.

In a particular aspect, an environmental probe is configured to be at least partially inserted into the ground at a location. The environmental probe includes one or more environmental sensors configured to generate environmental measurement data indicating one or more environmental measurements at the location. The environmental probe includes one or more wireless interfaces. The environmental probe also includes a memory. The environmental probe further includes a processor coupled to the memory, the one or more wireless interfaces, and the one or more environmental sensors. The processor is configured to determine an alert state at the location based on the environmental measurement data. The processor is further configured to initiate transmission of an indicator of the alert state to a remote device, such as a smart device hub or a cellular phone of a user, via the one or more wireless interfaces.

In another particular aspect, a method includes performing, using one or more environmental sensors of an environmental probe, one or more environmental measurements at a location to generate environmental measurement data. The environmental probe is configured to be at least partially inserted into the ground at the location. The method also includes determining, at the environmental probe, an alert state based on the environmental measurement data. The method further includes transmitting an indicator of the alert state from the environmental probe to a remote device.

In another particular aspect, a system for defensible space monitoring includes one or more environmental probes configured to be at least partially inserted into the ground at one or more locations. Each of the one or more environmental probes include one or more environmental sensors configured to generate environmental measurement data indicating one or more environmental measurements at one of the one or more locations, one or more wireless interfaces, a memory, and a processor coupled to the memory, the one or more wireless interfaces, and the one or more environmental sensors. The system further includes a hub device associated with a structure and configured to communicate with the one or more environmental probes to receive one or more alert messages from the one or more environmental probes based on the environmental measurement data generated by the one or more environmental probes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed apparatuses and methods, reference is now made to the implementations illustrated in greater detail in the accompanying drawing, in which.

Figure 1:
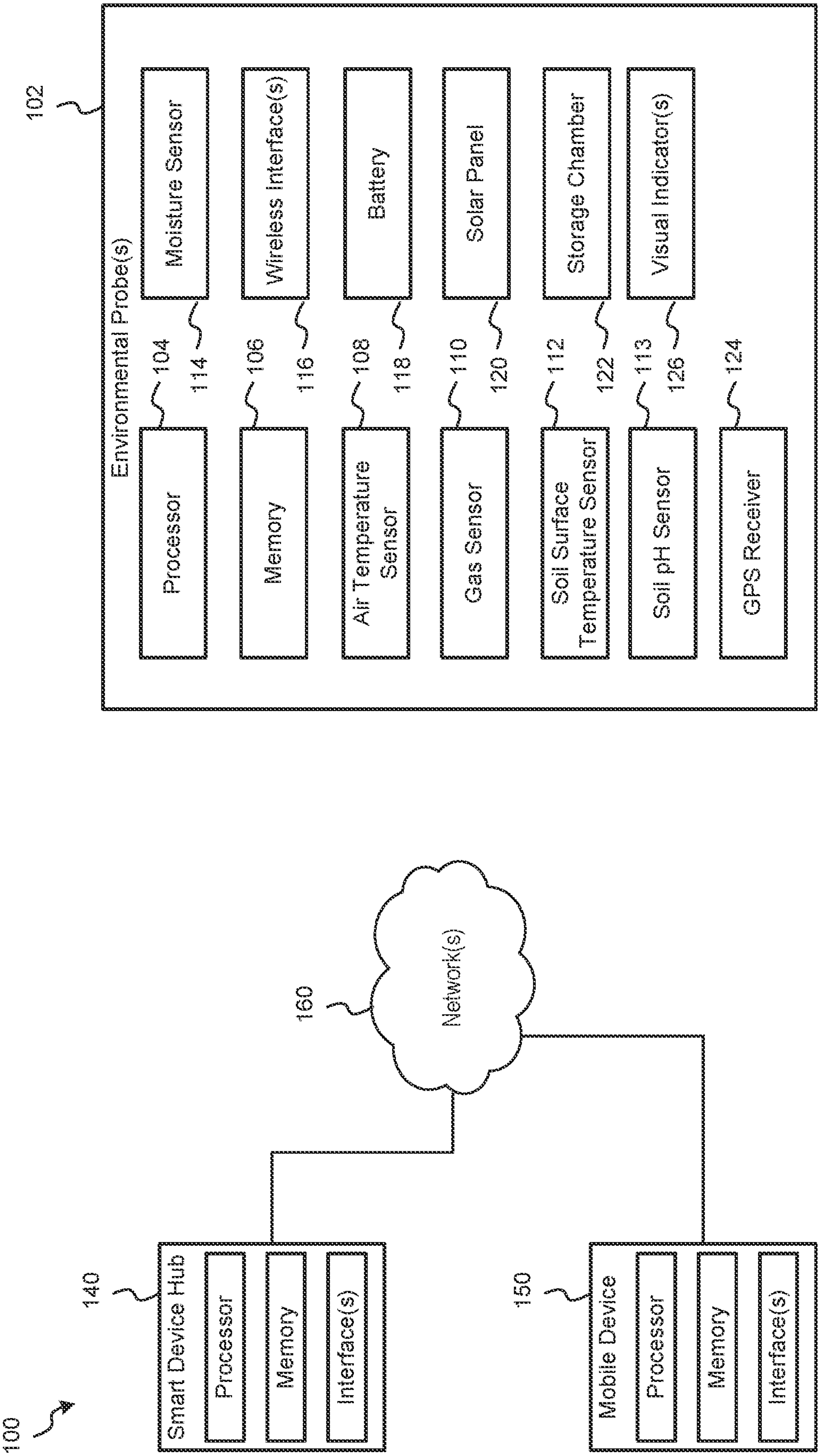
FIG. 1 is a block diagram of an example of a system for defensible space monitoring according to aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Aspects of the present disclosure provide an environmental probe configured to be at least partially inserted into the ground at a location and to provide defensible space monitoring and maintenance for a home (e.g., a residence) or other structure. The environmental probe may include one or more environmental sensors, such as an air temperature sensor, a gas sensor, a soil temperature sensor, a moisture sensor, a soil pH sensor, or a combination thereof, as non-limiting examples, configured to perform various environmental measurements to generate environmental measurement data. The environmental probe (e.g., a processor of the environmental probe) may compare the environmental measurement data to one or more thresholds to determine an alert state associated with the location. For example, the alert state may indicate detection of a wildfire, detection of a dry condition in the soil surrounding the environmental probe, detecting an over-watered condition in the soil, detection of other conditions, or a combination thereof. The environmental probe may be configured to transmit an indicator of the alert state to a remote device, such as a smart hub device or IoT management device. For example, the environmental probe may include a long range (LoRa) interface, a Wi-Fi interface (e.g., an IEEE 802.11 interface), a Bluetooth interface, a Bluetooth Low Energy (BLE) interface, a Zigbee interface, or the like, to enable communication with the smart hub device (or other remote device) and/or other nearby environmental probes for sharing or collecting environmental measurement data. In some implementations, the environmental probe may be configured to store a substance, such as weedicide or a hydrogel, for dispersal to an area surrounding the environmental probe. For example, the environmental probe may include a detachable nose cone formed at least partially from a dissolvable material that, upon dissolving, enables dispersal of the weedicide or other substance to the surrounding area. In this manner, the environmental probe may monitor and maintain a defensive space around the residence. Additionally or alternatively, by integrating the environmental probe in a smart home or other IoT system, the environmental probe may enable performance of one or more operations when an alert state is detected, such as initiation of an alarm within the residence, transmission of an alarm message to a mobile device, initiating a sprinkling system, deactivation of the sprinkling system, transmitting a status message to the mobile device or other device, transmission of an alert to a fire department, transmission of an alert (or the environmental measurement data) to an insurance company, or other response operations.

Although described as an environmental probe, in some implementations the environmental probe may include fewer, or none, electronic components and may instead be designed primarily to disperse a substance into the ground at a location. In such implementations, the environmental probe may be referred to as a substance dispersal device, and the substance dispersal device may include one or more outer walls and a nose cone to enable the substance dispersal device to be inserted into the ground at the location. The one or more outer walls may define an interior storage chamber for a substance to be dispersed, such as weedicide or hydrogel, as non-limiting examples. The one or more outer walls and the nose cone may be formed from dissolvable, biodegradable substance(s) such that the substance dispersal device will dissolve over time to release the substance without leaving behind non-biodegraded materials. In some such implementations, the substance dispersal device may include one or more electronic or other components that are formed from biodegradable materials to support functionality described with respect to the environmental probe.

Referring to FIG. 1, a block diagram of a system for defensive space monitoring according to aspects of the present disclosure is shown as system 100. The system 100 may include one or more environmental probes (e.g., smart environmental probes), such as an illustrative environmental probe 102, a smart device hub 140, and a mobile device 150. The various devices (e.g., the environmental probe 102, the smart device hub 140, and the mobile device 150) of the system 100 may be communicatively coupled to each other via one or more networks 160. It is noted that FIG. 1 illustrates one environmental probe, one smart hub device, and one mobile device for purposes of illustration, rather than by way of limitation and that other implementations of the present disclosure may be utilized with environments including more than one environmental probe, more than one smart device hub (or other remote device), more than one mobile device, or a combination thereof.

As shown in FIG. 1, the environmental probe 102 includes a processor 104 (e.g., one or more processors), a memory 106, one or more environmental sensors such as an air temperature sensor 108, a gas sensor 110, a soil surface temperature sensor 112, a soil pH sensor 113, a moisture sensor 114, one or more wireless interfaces 116, a solar panel 120, and a storage chamber 122. The environmental probe 102 may also optionally include a battery 118, a global positioning system (GPS) receiver 124, one or more visual indicators 126, or a combination thereof. The illustration of environmental probe 102 in FIG. 1 is illustrative and, in some other implementations, may not include all of the components shown or may include additional components. The processor 104 may be a central processing unit (CPU) or other computing circuitry (e.g., a microcontroller, one or more application specific integrated circuits (ASICs), and the like) and may have one or more processing cores. The memory 106 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 106 may store instructions that, when executed by the processor 104, cause the processor 104 to perform the operations described in connection with environmental probe 102 with reference to FIGS. 1-3 and 8. Additionally, the memory 106 may store environmental measurement data generated by the one or more environmental sensors (e.g., the air temperature sensor 108, the gas sensor 110, the soil surface temperature sensor 112, the soil pH sensor 113, and the moisture sensor 114), one or more thresholds for comparing to the environmental measurement data, or a combination thereof.

The air temperature sensor 108 may be configured to measure a temperature of the air surrounding the environmental probe 102. The gas sensor 110 may be configured to measure the levels of one or more particular fire-indicative gases, such as smoke, carbon dioxide (CO2), carbon monoxide (CO), and the like, particles such as particulate matter (PM 2.5), or a combination thereof. In some implementations, the air temperature sensor 108, the gas sensor 110, or another sensor may be configured to measure wind speed. The soil surface temperature sensor 112 may be configured to measure a temperature of the soil surrounding the environmental probe 102. The soil pH sensor 113 may be configured to measure a pH level of the soil surrounding the environmental probe 102. The moisture sensor 114 may be configured to measure a moisture of the soil surrounding the environmental probe 102. In some implementations, the soil surface temperature sensor 112, the soil pH sensor 113, and/or the moisture sensor 114 includes one or more electrodes or a single laminar electrode, either of which is configured to be at least partially inserted into the ground. In some other implementations, the soil surface temperature sensor 112, the soil pH sensor 113, and/or the moisture sensor 114 includes a non-contact sensor configured to be positioned above the ground, such as an infrared temperature sensor, as a non-limiting example. In other implementations, the soil surface temperature sensor 112, the soil pH sensor 113, and the moisture sensor 114 may be integrated within a multi-sensor configured to measure soil temperature, water content (e.g., moisture), conductivity, pH levels, other measurements, or a combination thereof.

The one or more wireless interfaces 116 may be configured to enable wireless communication between the environmental probe 102 and other nearby environmental probes, the smart device hub 140, the mobile device 150, or a combination thereof. In some implementations, the one or more wireless interfaces 116 include at least a first wireless interface configured to enable communication between the environmental probe 102 and a remote device, such as the smart device hub 140 or the mobile device 150, and a second wireless interface configured to enable communication between the environmental probe 102 and the nearby environmental probes. In some implementations, the first wireless interface and the second wireless interface each include a LoRa interface, a Wi-Fi interface (e.g., an IEEE 802.11 interface), a cellular interface, a Bluetooth interface, a BLE interface, a Zigbee interface, another type of low power network interface, or the like. The first wireless interface and the second wireless interface may be configured to communicate using the same or different communication technologies. Although two wireless interfaces are described, the environmental probe 102 may include any number of wireless interfaces of the types described herein to enable communications with remote devices, such as the smart device hub 140, the mobile device 150, the nearby environmental probes, or a combination thereof. The different types of wireless interfaces integrated in the environmental probe 102 may be selected based on an estimated distance between the environmental probe 102 and the smart device hub 140 and estimated distances between the environmental probe 102 and the nearby environmental probes.

The solar panel 120 may be configured to power the other components of the environmental probe 102. For example, the solar panel 120 may be positioned on top of the environmental probe 102 in order to receive sunlight for converting into the power provided to the other components of the environmental probe 102. Additionally or alternatively, the environmental probe 102 may optionally include the battery 118. For example, the solar panel 120 may be configured to charge (or recharge) the battery 118 (e.g., a rechargeable battery), the battery 118 may be configured to provide a backup source of power to the solar panel 120 (e.g., during times of insufficient sunlight), or the battery 118 may replace the solar panel 120. The battery 118 may include any type of rechargeable and/or removable/replaceable battery, such as a lithium ion battery, a lithium ion polymer (LiPo) battery, a nickel-metal hydride (NiMH) battery, a thin film lithium battery, a zinc battery, and the like.

The storage chamber 122 may be configured to store a substance for dispersal to an area surrounding the environmental probe 102. For example, the storage chamber 122 may include a hollow cavity within a portion of the environmental probe 102 that is configured as a storage chamber for storing a substance, such as a liquid, to be dispersed to the surrounding area. In some implementations, the substance is weedicide. In other implementations, the substance may be something other than weedicide, such as water, flame retardant, a temperature inhibitor, or another type of substance. As other examples, substance may include water retaining hydrogels, soil nutrients such as mycorrhiza, as a non-limiting example, insect pathogenic nematodes, other plant growth-promoting substances, or a combination thereof. The substances may include liquids or solids, such as hydrogel beads, that release the substance after absorbing a particular quantity of water. Additionally or alternatively, the substance may be encapsulated in water-absorbing hydrogels that absorb water when the surrounding soil is watered or during rain and release the water, and the substance, during dryer conditions. For example, one or more hydrogel beads may absorb water from the surrounding soil during or after rain and, when the surrounding soil becomes sufficiently dry, the hydrogel beads may release the absorbed water along with the encapsulated substance (e.g., soil nutrients, insect pathogenic nematodes, or the like) into the surrounding soil to moisten the soil and promote plant growth, particularly during dry or drought conditions. The weedicide or other substance stored in the storage chamber 122 may be dispersed due to dissolving of a detachable nose cone (or a portion thereof) and/or walls (e.g., outer walls or side walls) of the environmental probe 102, as further described with reference to FIG. 2.

The environmental probe 102 may optionally include the GPS receiver 124. The GPS receiver 124 may be configured to receive one or more positioning signals, such as from a GPS satellite, to enable determination of a position of the environmental probe 102. Additionally or alternatively, the environmental probe 102 may optionally include the one or more visual indicators 126. The one or more visual indicators 126 may be configured to indicate an alert state determined by the environmental probe 102, an error state associated with the environmental probe 102, other information, or a combination thereof. For example, the one or more visual indicators 126 may include one or more lights, a display for displaying one or more images, one or more color changing substances configured for release by the environmental probe 102, or one or more other types of visual indicators configured to indicate various states associated with the environmental probe 102. As one example, the one or more visual indicators 126 may include a first light having a first color configured to be initiated (e.g., lit up) when an alert state is detected by the environmental probe 102 and a second light having a second color configured to be initiated when an error state is detected by the environmental probe 102. As another example, the one or more visual indicators 126 may include a first color changing substance, such as inks or dyes, that is configured for release by the environmental probe 102 when an alert state is detected, and a second color changing substance that changes to a different color than the first color changing substance and that is configured for release by the environmental probe 102 when a different state is detected. Although described as two color changing substances, in other implementations, the one or more visual indicators 126 may include or correspond to a single color changing substance, such as an ink or dye, that is capable of changing between at least two different colors under the control of the environmental probe 102 based on detection of a state change associated with the environmental probe 102.

Other nearby environmental probes may each include the components described with reference to the environmental probe 102. In some implementations, the system 100 may also include an environmental probe hub device configured to receive environmental measurement data from the environmental probes (including the environmental probe 102) and to communicate the alert states, the non-alert states, status information, the environmental measurement data, or a combination thereof, to the smart device hub 140 (or other remote device). The smart device hub 140 may include at least a processor, a memory, and a wireless interface to enable communication with the environmental probe 102 and the mobile device 150. The smart device hub 140 may include or correspond to a hub of a smart device system that is configured to send instructions and/or receive data from one or more smart devices, such as smart lights, a smart thermostat, a smart watering system, and a smart alarm system, as non-limiting examples. In other implementations, the smart device hub 140 may be replaced with an IoT management device. The mobile device 150 may include at least a processor, a memory, and a wireless interface to enable communication with the smart device hub 140, and optionally with the environmental probe 102. The mobile device 150 may include or correspond to a smartphone, a tablet computing device, a personal computing device, a laptop computing device, a computer system of a vehicle, a personal digital assistant (PDA), a smart watch, another type of wireless computing device, or any part thereof.

During operation of the system 100, the environmental probe 102 may perform one or more environmental measurements using the one or more environmental sensors to generate environmental measurement data. For example, the air temperature sensor 108 may measure the air temperature, the gas sensor 110 may measure the level(s) of one or more gasses or particles in the air, the soil surface temperature sensor 112 may measure the soil surface temperature, the soil pH sensor 113 may measure the pH level of the soil, and the moisture sensor 114 may measure the moisture of the soil, as non-limiting examples. The environmental measurement data may indicate the measurements. For example, the environmental measurement data may indicate the air temperature, the gas or particle levels, the soil temperature, the soil pH level, the soil moisture, or a combination thereof. The environmental probe 102 may perform the environmental measurements periodically, such as according to a fixed schedule, based on changes in one or more measurements, or substantially continuously.

The processor 104 may determine an alert state associated with the location at which the environmental probe 102 is located based on the environmental measurement data. The alert state may indicate that a wildfire is detected or predicted, or another condition associated with maintenance of a defensible space by the environmental probe 102, such as a dry condition associated with the soil surrounding the environmental probe 102, an over-watered condition associated with the soil, a weather condition, or another condition that may require an action to remedy. To determine (e.g., detect) the alert state, the processor 104 may compare the environmental measurement data to one or more thresholds.

The thresholds may include an air temperature increase rate threshold, gas level thresholds, particle level thresholds, a soil surface temperature increase rate threshold, a moisture threshold, a soil pH level threshold, or a combination thereof, as non-limiting examples. To illustrate, the processor 104 may compare air temperatures indicated by the environmental measurement data to the air temperature increase rate threshold to determine if a rate of increase of the air temperature satisfies (e.g., is greater than or equal to) the air temperature increase rate threshold. As another example, the processor 104 may compare gas levels or particle levels indicated by the environmental measurement data to gas level thresholds or particle level thresholds to determine if the gas levels or particle levels satisfy the gas level thresholds and the particle level thresholds. As another example, the processor 104 may compare the soil surface temperatures indicated by the environmental measurement data to the soil temperature increase rate threshold to determine if a rate of increase of the soil temperature satisfies the soil temperature increase rate threshold. As another example, the processor 104 may compare the pH level of the soil indicated by the environmental measurement data to the soil pH level threshold to determine if the pH level satisfies the soil pH level threshold. As another example, the processor 104 may compare the moisture level of the soil indicated by the environmental measurement data to the moisture threshold to determine if the moisture level satisfies the moisture level threshold. If one or more of these thresholds (or a particular number) are satisfied, the processor 104 may determine the existence of the alert state. Alternatively, if none of the thresholds (or a particular number) are satisfied, the processor 104 may determine that no alert state is detected (e.g., the environmental probe 102 is in a non-alert state). In some implementations, the environmental probe 102 may receive additional environmental measurement data from nearby environmental probes, and the determination of the alert state may be based further on the additional environmental measurement data. In some implementations, the alert state may include other states in addition to a wildfire alert state. As a non-limiting example, the processor 104 may determine an alert state associated with a dry condition based on the moisture level failing to satisfy the moisture threshold. Detection of the dry condition may enable the smart device hub 140, or the environmental probe 102, to transmit an instruction to a sprinkler system to turn on the sprinkler system. As another example, the processor 104 may determine an alert state associated with an over-watered condition based on the moisture level satisfying a second moisture threshold, and the smart device hub 140 may transmit an instruction to the sprinkler system to deactivate the sprinkler system.

After determining the alert state, the processor 104 may initiate transmission of an indicator of the alert state to the smart device hub 140 via one of the one or more wireless interfaces 116. The indicator of the alert state may be transmitted periodically, such as according to a schedule, based on a change in the alert state, or substantially continuously. Based on the alert state indicated by the indicator, the smart device hub 140 may perform one or more operations. For example, if the alert state indicates detection or prediction of a wildfire, the smart device hub 140 may initiate an alarm, such as an audio alarm, a visual alarm, and the like, within the residence. As another example, if the alert state indicates detection or prediction of a wildfire, the smart device hub 140 may transmit an alarm message to the mobile device 150 to cause display of an alarm at the mobile device 150. Alternatively, the environmental probe 102 may transmit the alarm message to the mobile device 150. As yet another example, if the alert state indicates detection or prediction of a wildfire, the smart device hub 140 may transmit an alert message to a fire department or other agency. As another example, if the indicator indicates a non-alert state, the smart device hub 140 may perform one or more routine operations, such as receiving environmental measurement data from the environmental probe 102 and/or the other nearby environmental probes and providing the environmental measurement data to another device, such as a server or other device of a fire monitoring agency. As another example, if the alert state indicates detection of the dry condition, the smart device hub 140 may initiate a sprinkler system communicatively coupled to the smart device hub 140. In some implementations, an indication of the non-alert state may include additional status information, such as AQI levels, soil pH levels, and the like, that enable the environmental probe 102 to support non-fire related operations such as AQI monitoring and lawn/garden maintenance, as non-limiting examples. The above-described operations are illustrative and in other implementations, the smart device hub 140 may perform other operations based on receipt of the indicator of the alert state from the environmental probe 102.

In some implementations, the environmental probe 102 may be configured to communicate errors or warnings to the smart device hub 140. For example, the processor 104 may determine whether an error is associated with the environmental probe 102, such as a loss of wireless connection with nearby environmental probes, an error associated with a sensor, or a detection that the storage chamber 122 is empty (e.g., that the weedicide needs to be refilled), as non-limiting examples. Additionally or alternatively, the processor 104 may determine whether a power level associated with the environmental probe 102 fails to satisfy (e.g., is less than) a power level threshold. Based on determining the error condition, determining that the power level fails to satisfy the power level threshold, or a combination thereof, the processor 104 may initiate transmission of a message to the smart device hub 140 via the one or more wireless interfaces 116. The message may indicate the error condition, a low power condition, or a combination thereof. The smart device hub 140 may perform one or more operations based on the message, such as transmitting a message for display to the mobile device 150 or initiating an output via an output device to indicate the status of the environmental probe 102. Although described as a separate message, in some other implementations, the alert state or non-alert state may indicate the error or status of the environmental probe 102.

Although described as the processor 104 of the environmental probe 102 determining the alert state (and other status information) and initiating transmission of an indication of the alert state to the smart device hub 140, in other implementations, the environmental probe 102 is configured to transmit the environmental measurement data to an environmental probe hub device, and the environmental probe hub device is configured to determine the alert state (and other status information) and to communicate with the smart device hub 140. In some other implementations, the environmental probe 102 (or the environmental probe hub device) may be configured to transmit the environmental measurement data to the smart device hub 140, and the smart device hub 140 may be configured to determine the alert state and other status information. In some other implementations, the environmental probe 102 (or the environmental probe hub device) may be configured to transmit the indicator of the alert state or other status information, or the environmental measurement data, directly to another remote device instead of the smart device hub 140. For example, the indicator or the environmental measurement data may be transmitted to a server of a fire department or other government agency. As another example, the indicator of the alert state or the environmental measurement date may be transmitted to a server of an insurance company, which may provide an owner of the residence with a reduced insurance rate for providing such information.

Although described as an environmental probe or a smart probe, in some implementations, aspects of the environmental probe 102 may be implemented in a device that includes fewer, or none, of the electronic components described with reference to the environmental probe 102. For example, a substance dispersal device may include the storage chamber 122 and a nose cone, as further described herein with reference to FIG. 2, and may not include one or more of the processor 104, the memory 106, the air temperature sensor 108, the gas sensor 110, the soil surface temperature sensor 112, the soil pH sensor 113, the moisture sensor 114, the wireless interfaces 116, the battery 118, the solar panel 120, the GPS receiver 124, and the one or more visual indicators 126. In some implementations, the walls and nose cone of the substance dispersal device may be formed from a dissolvable, biodegradable material that dissolves over time to disperse a substance stored within into the surround soil without leaving non-degraded materials in the soil. In some such implementations, the substance dispersal device may include one or more biodegradable electronic or other components. As a non-limiting example, the substance dispersal device may include the moisture sensor 114 and the one or more visual indicators 126 that are formed from biodegradable materials and configured to visually represent soil moisture detected by the moisture sensor 114 using different colors of the one or more visual indicators 126. Examples of substance dispersal devices are further described herein with reference to FIGS. 4A-C and 5A-B.

According to one or more aspects, an environmental probe (e.g., 102) may be configured to be at least partially inserted into the ground at a location. The environmental probe may include one or more environmental sensors (e.g., 108-114) configured to generate environmental measurement data indicating one or more environmental measurements at the location. The environmental probe may also include one or more wireless interfaces (e.g., 116) and a memory (e.g., 106). The environmental probe may further include a processor (e.g., 104) coupled to the memory, the one or more wireless interfaces, and the one or more environmental sensors. The processor may be configured to determine an alert state at the location based on the environmental measurement data and to initiate transmission of an indicator of the alert state to a remote device (e.g., the 140) via the one or more wireless interfaces.

According to one or more aspects, a system for defensible space monitoring includes one or more environmental probes (e.g., 102) configured to be at least partially inserted into the ground at one or more locations. Each of the one or more environmental probes include one or more environmental sensors (e.g., 108-114) configured to generate environmental measurement data indicating one or more environmental measurements at one of the one or more locations, one or more wireless interfaces (e.g., 116), a memory (e.g., 106), and a processor (e.g., 104) coupled to the memory, the one or more wireless interfaces, and the one or more environmental sensors. The system further includes a hub device (e.g., 140) associated with a structure and configured to communicate with the one or more environmental probes to receive one or more alert messages from the one or more environmental probes based on the environmental measurement data generated by the one or more environmental probes.

As described with reference to FIG. 1, the system 100 provides an integrated smart system (or IoT system) to perform defensible space monitoring and alerting. For example, the environmental probe 102 may be configured to perform one or more environmental measurements that enable determination of an alert state associated with a defensible space surrounding a residence or other structure near which the environmental probe 102 is positioned. Based on an indication of the alert state, the smart device hub 140 may perform one or more operations, such as initiating an alarm. In this manner, one or more environmental probes may be integrated with a smart home system or other IoT system to provide defensible space monitoring and alerting for a residence or other structure.

Figure 2:
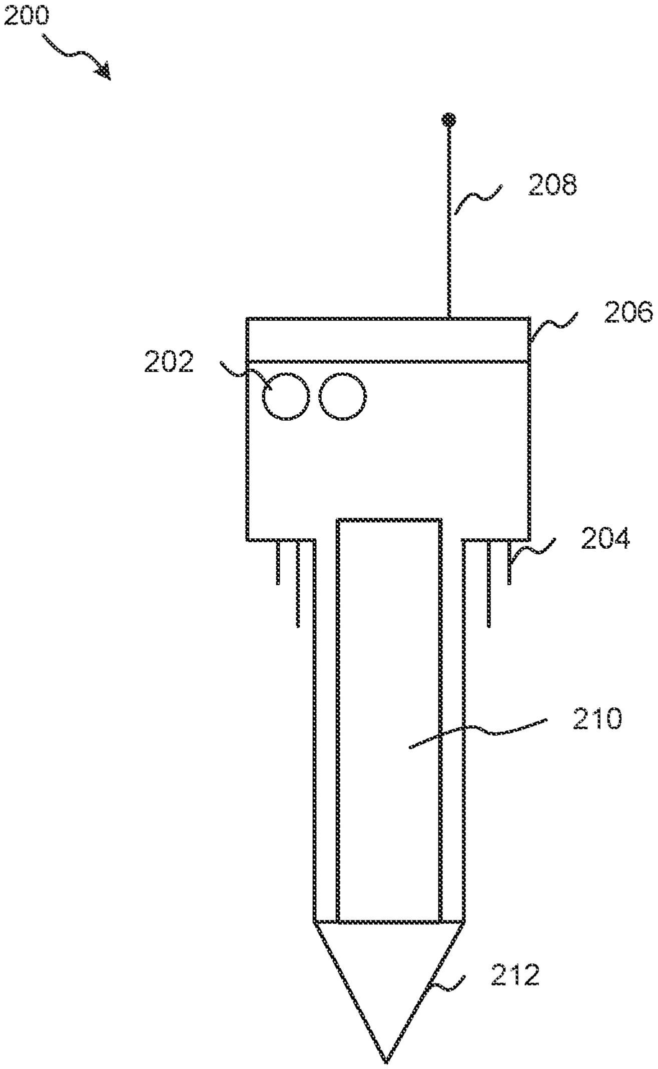
FIG. 2 is a diagram of an example of an environmental probe according to aspects of the present disclosure.

Referring to FIG. 2, a diagram of an environmental probe according to aspects of the present disclosure is shown as environmental probe 200. In some implementations, the environmental probe 200 includes or corresponds to the environmental probe 102 of FIG. 1. In some implementations, the environmental probe 200 may have a substantially cylindrical shape. In some other implementations, the environmental probe 200 has a substantially rectangular or substantially triangular shape, or another shape.

As shown in FIG. 2, the environmental probe 200 may include air temperature and gas sensors 202, soil temperature, pH, and moisture sensors 204, a solar panel 206, an antenna 208, a storage chamber 210, and a detachable nose cone 212. Although described as a cone, in other implementations, the detachable nose cone 212 may have other shapes, such as a pyramidal shape with a rectangular or triangular base, as a non-limiting example. Environmental probe 200 may also include one or more internal components, which are not shown for convenience, such as a processor, a memory, one or more wireless interfaces, an optional battery, a GPS receiver, or a combination thereof, as further described with reference to FIG. 1. In some implementations, the environmental probe 200 may have substantially cylindrical shape or cross-section with a narrow radius. In some other implementations, the environmental probe 200 has a substantially rectangular shape (or cross-section), a substantially triangular shape (or cross-section), or another shape. In some implementations, the environmental probe 200 may narrow or taper from the top to the bottom. For example, the portion of the environmental probe 200 that is disposed above-ground may be approximately 10 centimeters (cm), and a radius of the portion may be approximately 3 cm. The portion of the environmental probe 200 that is inserted into the ground may have a narrower radius, such as 1-2 cm. The dimensions are illustrative and not to be considered limiting, in other implementations, the environmental probe 200 may have other dimensions.

The air temperature and gas sensors 202 may include an air temperature sensor, one or more gas or particle sensors, or a combination thereof, that are configured to measure an ambient air temperature and levels of one or more fire-indicative gases, such as smoke, CO, or CO2, or one or more fire-indicative particles (e.g., particle(s) having a particular molecular composition, particle(s) having a particular size, or a combination thereof), such as PM 2.5 as a non-limiting example. At least a portion of the air temperature and gas sensors 202 may be external to the environmental probe 200, as shown in FIG. 2.

The soil temperature, pH, and moisture sensors 204 may include a soil surface temperature sensor, a soil pH sensor, a moisture sensor, or a combination thereof, that are configured to measure a temperature of the surface of the soil surrounding the environmental probe 200, a pH level of the soil, and a moisture level of the soil. In some implementations, the soil temperature, pH, and moisture sensors 204 may include one or more electrodes that protrude from a portion of the environmental probe 200 and are configured to be at least partially inserted into the ground (e.g., the soil), as shown in FIG. 2. In some other implementations, the soil temperature, pH, and moisture sensors 204 may include one or more laminar electrodes (e.g., laminar leaf electrodes) that are configured to be at least partially inserted into the ground. In some other implementations, the soil temperature, pH, and moisture sensors 204 include one or more sensors that are configured to be attached to a portion of the environmental probe 200 that is above the ground, such as a non-contact laser temperature probe, as a non-limiting example.

The solar panel 206 may be configured to power the other components of the environmental probe 200. For example, the solar panel 206 may be positioned on top of the environmental probe 200 in order to receive sunlight for converting into the power provided to the other components of the environmental probe 200. In some implementations, the solar panel 206 may also charge (or recharge) a rechargeable battery of the environmental probe 200.

The antenna 208 may be configured to enable wireless connection between the environmental probe 200 and other devices. For example, the antenna 208 (and one or more wireless interfaces) may enable wireless communication between the environmental probe 200 and a remote device, such as a smart hub device, a mobile device, a server, or other environmental probes. In some implementations, the antenna 208 is configured to enable connection to one or more wireless networks, such as a Wi-Fi network (e.g., an IEEE 802.11 compliant wireless network), a LoRa network, a Bluetooth network, a BLE network, a Zigbee network, a cellular network, a mesh network, another type of low power wireless network, or a combination thereof, one or more device to device communications, or a combination thereof.

The storage chamber 210 may be configured to store a substance for dispersal to an area surrounding the environmental probe 200. For example, the storage chamber 210 may include a hollow cavity within a portion of the environmental probe 200, as shown in FIG. 2, that is configured as a storage chamber for storing a substance, such as weedicide, soil nutrients, insect pathogenic nematodes, water retaining hydrogels, or the like. The storage chamber 210 may be defined by one or more outer walls of the environmental probe 200 (or a portion thereof). In some implementations, the environmental probe 200 may also include one or more additional walls or shells (e.g., in addition to the one or more outer walls) that contribute to a thickness of the environmental probe 200 and that further define the storage chamber 210, as further described herein with reference to FIGS. 5A-B.

The detachable nose cone 212 may be attachable to and detachable from the remainder of the environmental probe 200. For example, the detachable nose cone 212 may be held by one or more retention elements or may be screwed into a portion of the environmental probe 200. In some implementations, the detachable nose cone 212 has a conical shape that tapers to a point at the bottom of the detachable nose cone 212, as shown in FIG. 2, to enable easier insertion of the environmental probe 200 into the ground. In some implementations, only the detachable nose cone 212 is inserted into the ground, while the remainder of the environmental probe 200 remains above-ground. The detachable nose cone 212 may be formed from or include one or more dissolvable materials such that one or more dissolvable walls are configured to dissolve over time to release (e.g., cause dispersal of) the weedicide or other substance stored in the storage chamber 210. For example, the detachable nose cone 212 may be formed from polyvinyl alcohol (PVA, PVOH, or PVAl) or polyvinyl plastic. Alternatively, the detachable nose cone 212 may be formed from one or more plant-based materials, such as corn starch, that are dissolvable over time. A thickness of the material(s) used to form the detachable nose cone 212 may determine the dissolving time of the detachable nose cone 212. In some implementations, the walls of the tip of the detachable nose cone 212 are thicker than the side walls of the remainder of the detachable nose cone 212 to bear the shear forces applied when the detachable nose cone 212 is inserted into the ground. The thinner side walls allow more rapid dissolving for dispersal of the weedicide to surrounding area. In some implementation, an entirety of the detachable nose cone 212 is formed from the same material(s). Alternatively, the walls of the tip of the detachable nose cone 212 may be formed from a first material(s) that has a slower dissolving rate than a second material(s) used to form the sidewalls of the remainder of the detachable nose cone 212. In some implementations, the one or more outer walls of the environmental probe 200 that define the storage chamber 210 may also be formed from dissolvable materials, similar to the detachable nose cone 212.

The weedicide, or other substance, may be dispersed in the surrounding area of the environmental probe 200. For example, the weedicide may be dispersed within a range of approximately 1-10 feet from the environmental probe 200. In some implementations, the weedicide is encapsulated in water-rich hydrogels to enhance the controlled delivery and increase the duration over which the weedicide lasts, while keeping the soil hydrated and/or reducing a toxicity of the weedicide. Alternatively, other substances may be dispersed, such as substances to promote plant growth in dry or drought conditions. Although the weedicide or other substance is described as dispersed from underneath the ground due to the dissolving of the detachable nose cone 212, in other implementations, the environmental probe 200 may include a pump or sprayer that is configured to disperse the weedicide for larger distances.

In some implementations, an external surface of the environmental probe 200 may be waterproof to protect the internal components, such as the internal electronic components, from rain, moisture, or other water. Additionally or alternatively, the external surface of the environmental probe 200 and/or one or more external components of the environmental probe 200 may be configured to withstand various weather or elements, such as sunlight/ultraviolet (UV) rays, wind, cold, heat, and the like. For example, the external surface of the environmental probe 200 may be weather-proofed or include a weatherproof coating, as a non-limiting example.

As described with reference to FIG. 2, the environmental probe 200 supports defensible space monitoring and maintenance. For example, as the detachable nose cone 212 dissolves, weedicide may be dispersed to the surrounding area to limit or prevent vegetation growth in the surrounding area, thereby maintaining the surrounding area as a defensible space. Additionally, the antenna 208 may enable wireless communication with a smart device hub, which may enable the environmental probe 200 to be integrated within a smart home system to provide defensible space monitoring and alerting, as described with reference to FIG. 1.

Figure 3:
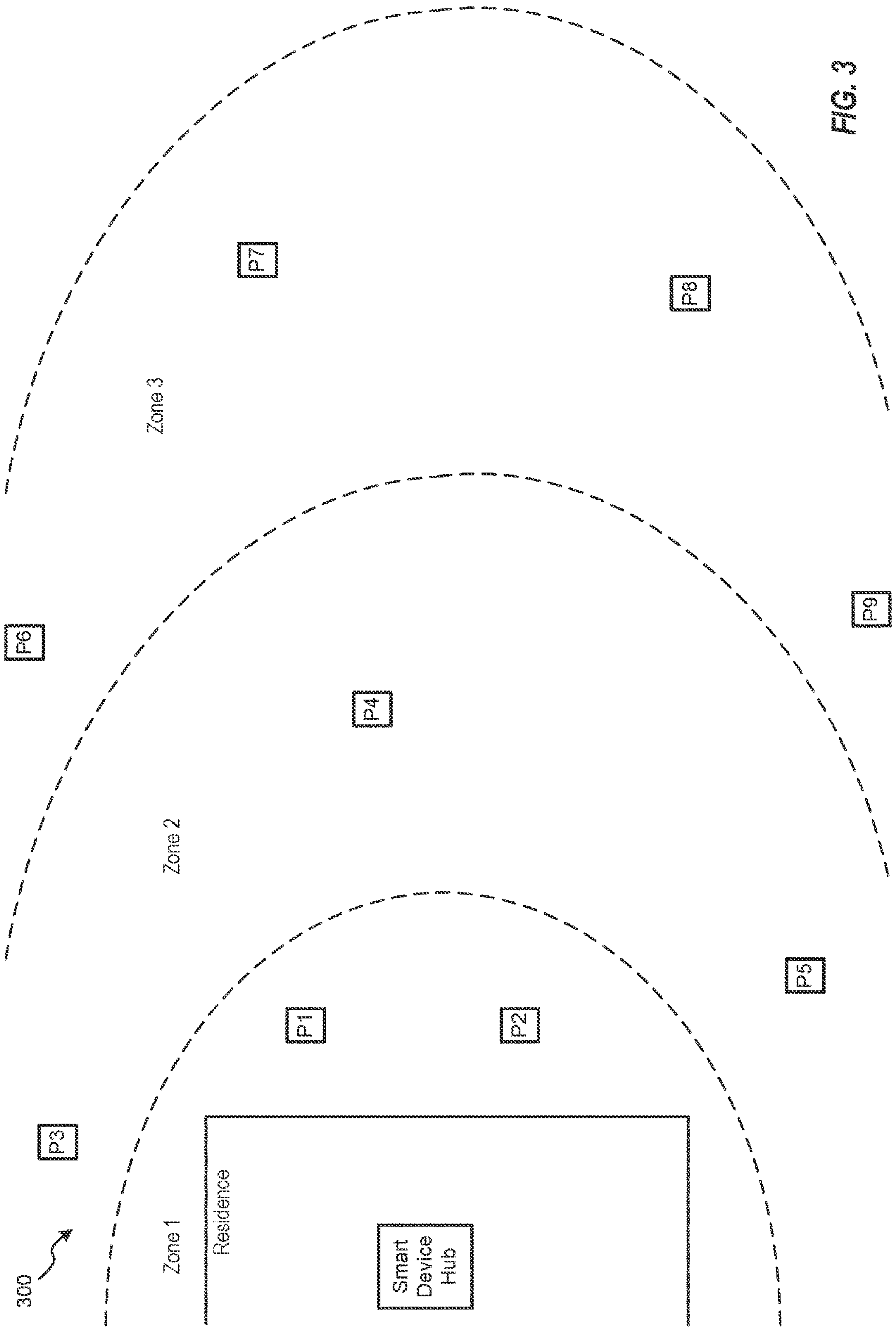
FIG. 3 is a diagram of an example of a system for defensible space monitoring and maintenance at a residence according to aspects of the present disclosure.

Referring to FIG. 3, a diagram of a system for defensible space monitoring and maintenance of a residence according to aspects of the present disclosure is shown as system 300. As shown in FIG. 3, the system 300 may include a smart device hub and multiple environmental probes P1-P9. Although nine environmental probes are shown in FIG. 3, in other implementations, the system 300 may include fewer than nine or more than nine environmental probes, more than one smart hub device, other device(s), or a combination thereof. In some implementations, the environmental probes P1-P9 include or correspond to the environmental probe 102 of FIG. 1 or the environmental probe 200 of FIG. 2. Although described as environmental probes, in other implementations, one or more of the environmental probes P1-P9 may be replaced with, or the system 300 may also include, one or more substance dispersal devices, as further described with reference to FIGS. 4A-C and 5A-B.

FIG. 3 shows a division of an area around a residence into three zones: a first zone ("Zone 1"), a second zone ("Zone 2"), and a third zone ("Zone 3"). Although described as a residence, the residence may be any building or structure, or other type of asset, for which wildfires are a danger or which are included in wildfire-related regulations or laws, such as a home, an apartment, a farm, a storage facility, a business, a barn, a shed, a commercial building, a government or public utilities building or asset, such as a power plant, power lines, a power station, an electrical grid, solar panels, wind turbines, or the like, or another type of structure. In some implementations, the three zones may correspond to a division of a defensible space that is mandated for particular residences or other buildings, such as by California law for homes in the state responsibility area (SRA), as a non-limiting example. In some implementations, Zone 1 extends 0-5 feet from the residence, Zone 2 extends from the edge of Zone 1 to approximately 30 feet from the residence, and Zone 3 extends from the edge of Zone 2 to approximately 100 feet from the residence. Different regulations may apply to the different zones. For example, California law may regulate that Zone 1 and Zone 2 are kept vegetation free, or that vegetation is kept to a minimum combustible mass, while vegetation in Zone 3 is regulated to be vertically and or horizontally separated from other vegetation. Regulations may also specify that noncombustible mulch products are to be used, regular watering of non-flammable plants is to occur, and the removal of flammable and dead plant material is to occur within Zone 1, while maintenance of plants and pruning below a certain height to prevent fire from climbing into a top portion of trees or shrubs is to occur within Zone 2 and Zone 3.

The environmental probes P1-P9 may be dispersed through the zones. For example, environmental probes P1-P2 may be located in Zone 1, environmental probes P3-P5 may be located in Zone 2, and environmental probes P6-P9 may be located in Zone 3. In some implementations, the environmental probes P1-P9 may be manually inserted into the ground. Alternatively, the environmental probes P1-P9 may be inserted into the ground by being fired or otherwise launched from a delivery vehicle, such as an aerial drone, or pushed by or towed behind, or otherwise inserted by, aerators. In some implementations, one or more of the environmental probes P1-P9 may include a corresponding detachable nose cone, as described with reference to FIG. 2, prior to insertion into the ground. For example, the environmental probes within Zone 1 (e.g., the environmental probes P1-P2), and possibly the environmental probes within Zone 2 (e.g., the environmental probes P3-P5), may include detachable nose cones and may store weedicide or another substance for dispersal throughout Zone 1 and Zone 2, and the environmental probes within Zone 3 (e.g., the environmental probes P6-P9) may not include the detachable nose cone and may not store weedicide. Additionally or alternatively, one or more of the environmental probes P1-P9 may include GPS receivers. For example, the environmental probes within Zone 3 (e.g., the environmental probes P6-P9) may be spaced apart at sufficient distances that the environmental probes include GPS receivers for communicating position data in addition to the other information communicated by the environmental probes P6-P9.

The environmental probes P1-P9 may be configured to wirelessly communicate amongst one another. For example, the environmental probes P1-P9 may be configured to form a mesh network to enable communication of environmental measurement data, alert state information, position data, error information, and the like, between the environmental probes P1-P9. One or more of the environmental probes P1-P9 may also be configured to communicate with the smart hub device. As one example, the environmental probes P1 and P2 may be configured to communicate with the smart hub device via a Wi-Fi network, however, the Wi-Fi network may not extend to the environmental probes P3-P9, and as such, the environmental probes P1 and P2 may be configured to communicate with the environmental probes P3-P9 using other protocols, such as a Bluetooth protocol, a BLE protocol, a Zigbee protocol, another type of low power communication protocol, and the like. As another example, the environmental probes P6-P9 within Zone 3 may be spaced sufficiently apart from each other and the remaining environmental probes that the environmental probes P6-P9 are configured to communicate with the environmental probes P1-P5 or the smart hub device using a LoRa protocol or a cellular protocol, as non-limiting examples. Such examples are illustrative and are not limiting, and in other implementations any of the environmental probes P1-P9 may be configured to communicate with others of the environmental probes P1-P9 or the smart device hub using any of a Wi-Fi protocol (e.g., an IEEE 802.11 compliant protocol), a Bluetooth protocol, a BLE protocol, a Zigbee protocol, another type of low power communication protocol, a LoRa protocol, a cellular protocol, or another type of communication protocol.

Figure 4A:
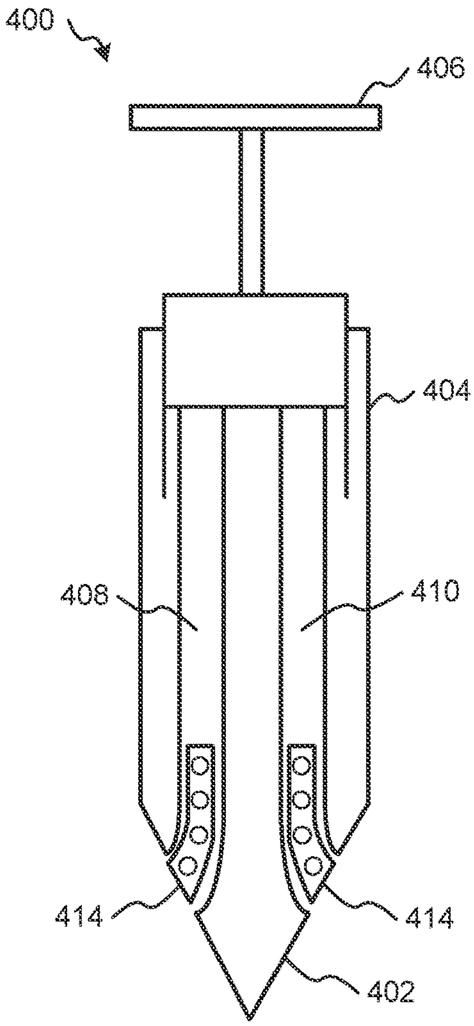
FIGS. 4A-C illustrate views of an example of a substance dispersal device according to aspects of the present disclosure.
Figure 4B:
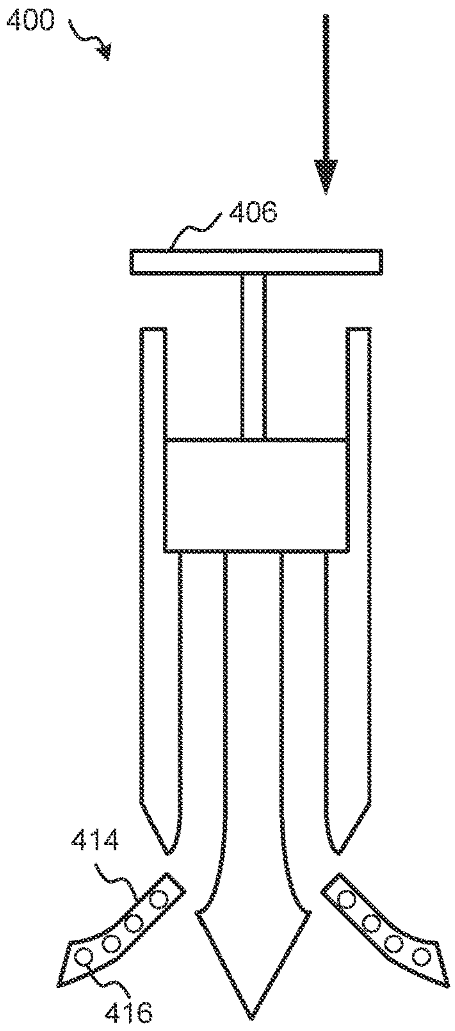
Figure 4C:
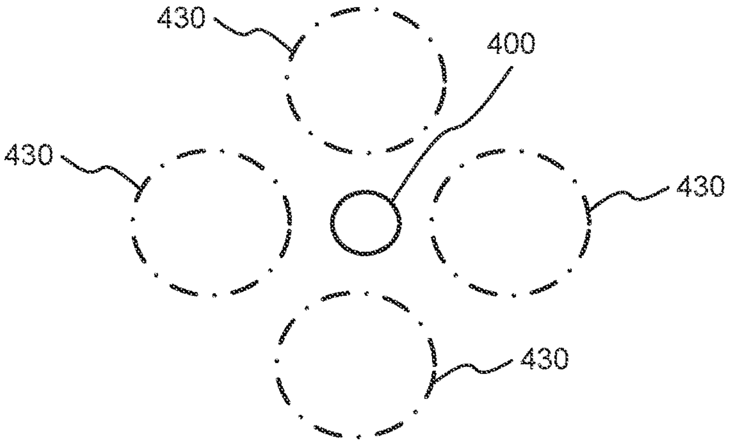

Referring to FIGS. 4A-C, an example of a substance dispersal device according to aspects of the present disclosure is shown as a substance dispersal device 400. In some implementations, the substance dispersal device 400 includes or corresponds to the environmental probe 102 of FIG. 1 or the environmental probe 200 of FIG. 2. Alternatively, the substance dispersal device 400 may include fewer, or no, electronic components as included in the environmental probe 102 of FIG. 1 or the environmental probe 200 of FIG. 2. In some implementations, the substance dispersal device 400 may have a substantially cylindrical shape. In some other implementations, the substance dispersal device 400 has a substantially rectangular or substantially triangular shape, or another shape.

FIG. 4A depicts a side view of the substance dispersal device 400. As shown in FIG. 4A, the substance dispersal device 400 includes a nose cone 402, one or more side walls 404, and a handle 406. In some implementations, the nose cone 402 is part of the substance dispersal device 400 (as opposed to a detachable nose cone, as described with reference to FIGS. 1-2) and configured to enable insertion of the substance dispersal device 400 into the ground at a selected location. In some other implementations, the nose cone 402 may be detachable. The one or more side walls 404 may define an interior of the substance dispersal device 400. For example, if the substance dispersal device 400 has a cylindrical shape, the one or more side walls 404 may include a single exterior wall that defines a cylindrical interior. If the substance dispersal device 400 has a different shape, the one or more side walls 404 may include one or multiple side walls that define the interior. The interior of the substance dispersal device 400 that is defined by the one or more side walls 404 may include a first passageway 408 and a second passageway 410. The first passageway 408 and the second passageway 410 may be configured to store one or more substances for dispersal into the ground near the substance dispersal device 400. In some other implementations, the passageways 408-410 may be replaced with a storage chamber, as described above with reference to FIGS. 1-2. The handle 406 may extend from ground when the substance dispersal device 400 is inserted into the ground. The handle 406 may be configured to operate as a pump that, when a downward force is applied by a user, expels the substance(s) stored in the passageways 408-410. In some implementations, rods in each of the passageways 408-410 may be coupled to the bottom of the handle 406 to enable the handle 406 to cause dispersal of substance(s) from the passageways 408-410 when the handle 406 is depressed. In some other implementations, the handle 406 may be configured to operate as a pneumatic pump to disperse the substance(s).

Prior to depression of the handle 406, the passageways 408-410 may store a substance 414. The substance 414 may include weedicide, other substances, hydrogels of other substances, such as moistening agents, fertilizer, soil nutrients, insect killing substances, other substances that assist in maintaining a defensible space around a structure, or the like. Although shown in FIG. 4A as the same substance 414 being stored in both of the passageways 408-410, in other implementations, the first passageway 408 may store a different substance than the second passageway 410. Additionally or alternatively, although two passageways are shown, in other implementations, the substance dispersal device 400 may include a single passageway (or chamber) or more than two passageways.

Although not shown for ease of illustration, the substance dispersal device 400 may include one or more components of the environmental probe 102 or the environmental probe 200. For example, the substance dispersal device 400 may include one or more of a processor, a memory, one or more wireless interfaces, one or more environmental sensors, a GPS receiver, a battery, a solar panel, or one or more visual indicators, as non-limiting examples. The components, when included in the substance dispersal device 400, may enable the substance dispersal device 400 to perform all, or a subset, of the functionality described above with reference to the environmental probe 102 of FIG. 1 or the environmental probe 200 of FIG. 2. Alternatively, the substance dispersal device 400 may not include any electronic components and may not have any smart device functionality.

In some implementations, the nose cone 402 and the one or more side walls 404 may be dissolvable over time. For example, the nose cone 402 and the one or more side walls 404 may be formed from one or more dissolvable materials, such as polyvinyl alcohol (PVA, PVOH, or PVAl) or polyvinyl plastic, one or more plant-based materials such as corn starch, or the like, that are dissolvable over time. In some such implementations, an entirety of the substance dispersal device 400 and any components included therein (other than optionally the handle 406) may be formed from dissolvable materials. For example, an entirety of the substance dispersal device 400 may be dissolvable to reduce (or eliminate) the environmental impact of the substance dispersal device 400. Alternatively, the handle 406 may be formed from non-dissolvable materials, such that the handle 406 may include one or more electronic or other non-dissolvable components, and after the rest of the substance dispersal device 400 dissolves, the handle 406 may be retrieved and disposed of (or reused) by a person or an unmanned autonomous vehicle. In addition or alternatively to being dissolvable, the materials may be biodegradable such that the substance dispersal device 400 does not leave behind materials or pollutants in the ground after dissolving. A thickness of the material(s) used to form the nose cone 402 and the one or more side walls 404 may control the dissolving time of the nose cone 402 and the one or more side walls 404. For example, thicker walls may result in longer dissolve times while thinner walls may result in shorter dissolve times. In some implementations, the one or more side walls 404 may include one or multiple shells, with the number of shells being selected to achieve a particular dissolve time, as further described herein with reference to FIG. 5A.

FIG. 4B depicts a side view of the substance dispersal device 400 after the handle 406 is depressed. After depression of the handle 406, the bottom of the handle 406 (e.g., a pump, one or more rods, etc.) push the substance 414 out of the passageways 408-410. In some implementations, the substance 414 may include hydrogel beads 416 configured to distribute the substance 414 to the soil surrounding the substance dispersal device 400 after a particular amount of moisture (e.g., water or another liquid) is absorbed by the hydrogel beads 416. In this manner, the hydrogel beads 416 may be dispersed outward from the substance dispersal device 400 before the substance 414 is released, enabling longer distance dispersals than if the substance 414 is stored in the passageways 408-410 in liquid form.

FIG. 4C depicts an aerial view of the substance dispersal device 400 inserted into the ground at a selected location. FIG. 4C also depicts one or more regions 430 proximate to the substance dispersal device 400. The regions 430 indicate possible regions of dispersal of the substance 414. For example, if the substance dispersal device 400 includes four passageways, the substance 414 may be dispersed to all of the regions 430 illustrated in FIG. 4C. In other implementations, the regions 430 may include fewer than four or more than four regions, and may be based on the number of distinct passageways included in the interior of the substance dispersal device 400. Accordingly, the substance dispersal device 400 may be configured to disperse the substance 414 to soil surrounding the substance dispersal device 400 to configure and maintain a defensible space (optionally with one or more other substance dispersal devices 400), as described above with reference to FIG. 3.

Figure 5A:
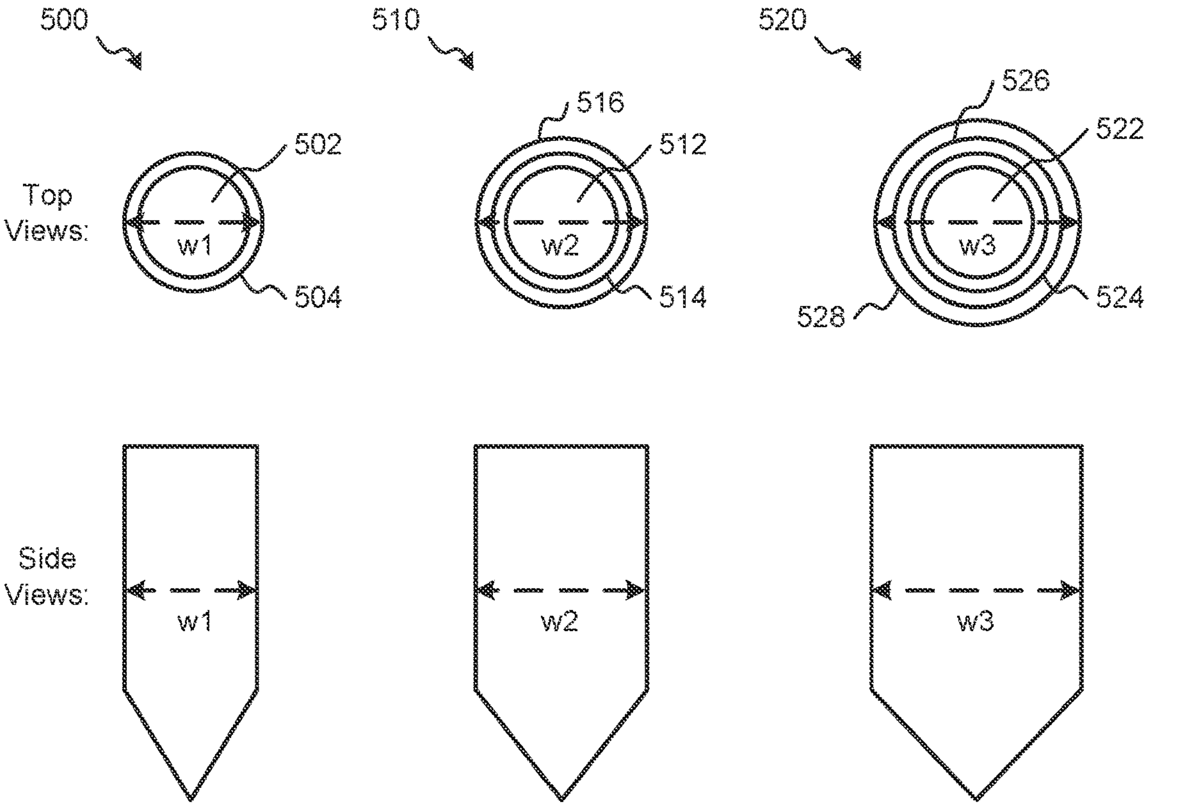
FIGS. 5A-B illustrate views of three examples of substance dispersal devices according to aspects of the present disclosure.
Figure 5B:
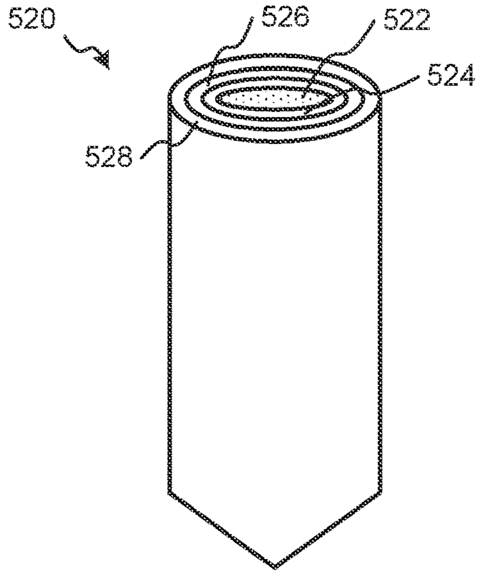

Referring to FIGS. 5A-B, examples of three substance dispersal devices according to aspects of the present disclosure are shown as a first substance dispersal device 500, a second substance dispersal device 510, and a third substance dispersal device 520. FIG. 5A depicts top views and side views of the first substance dispersal device 500, the second substance dispersal device 510, and the third substance dispersal device 520. FIG. 5B depicts a three-dimensional (3D) view of the third substance dispersal device 520. In some implementations, one or more of the substance dispersal devices 500, 510, and 520 may include or correspond to the substance dispersal device 400 of FIG. 4. Additionally or alternatively, one or more of the substance dispersal devices 500, 510, and 520 may include or correspond to the environmental probe 102 of FIG. 1 or the environmental probe 200 of FIG. 2. Alternatively, one or more of the substance dispersal devices 500, 510, and 520 may include fewer, or no, electronic components that are included in the environmental probe 102 of FIG. 1 or the environmental probe 200 of FIG. 2. In some implementations, the substance dispersal devices 500, 510, and 520 may have substantially cylindrical shapes. In some other implementations, the substance dispersal devices 500, 510, and 520 have substantially rectangular or substantially triangular shapes, or other shapes.

As shown in the top-view of FIG. 5A, the first substance dispersal device 500 includes a storage chamber 502 defined by a shell 504. The shell 504 may include or correspond to a wall (e.g., an external or side wall) that defines an interior of the first substance dispersal device 500 (e.g., the storage chamber 502). In some implementations, the shell 504 may be formed from dissolvable, biodegradable materials, as described above with reference to FIGS. 4A-C. The shell 504 may be formed by additive manufacturing processes, such as 3D printing, or by other manufacturing processes. The shell 504 may have a particular thickness $w_s$, such as 0.4 millimeters (mm) as a non-limiting example. A width of the first substance dispersal device 500 is based on the thickness $w_s$ and a dimension (e.g., diameter) of the storage chamber 502. For example, the width $w_1$ may be equal to a sum of $\text{dimension}_{chamber}$ and 2 $w_s$.

As shown in the side view of FIG. 5A, the shell 504 extends from a first end toward a second end, where the sides narrow to form. The nose cone and the shell 504 may be a unitary structure or may be separate structures. A dissolving rate or time of the first substance dispersal device 500 may be based on a thickness of the shell 504, the types of materials used to form the shell 504 and the nose cone, and an infill pattern of the nose cone (as described further herein with reference to FIG. 6). The storage chamber 502 may be configured to store a substance for dispersal into the soil surrounding the first substance dispersal device 500. For example, as the shell 504 (and the nose cone) dissolve, the substance stored in the storage chamber 502 may be dispersed into the surrounding soil at the location at which the first substance dispersal device is inserted into the ground. The substance may include a hydration agent, weedicide, soil nutrients, insect toxins, or other substances, and in some implementations may be stored in the storage chamber 502 as hydrogel beads. For example, non-hydrated hydrogel beads may be placed within the storage chamber 502 and, when the surrounding soil is watered, the shell 504 dissolves and disperses the hydrogel beads into the surrounding soil for providing a substance after absorption of sufficient water or moisture.

To increase the thickness and dissolving rate of a substance dispersal device, additional shell(s) may be added. For example, the second substance dispersal device 510 includes a storage chamber 512 defined by a first shell 514 that is interior to a second shell 516. Each of the shells 514-516 may have a thickness of $w_s$, and a width $w_2$ of the second substance dispersal device 510 may be equal to a sum of $\text{dimension}_{chamber}$ and 4 $w_s$. As another example, the third substance dispersal device 520 includes a storage chamber 522 defined by a first shell 524 that is interior to a second shell 526, and the second shell 526 is interior to a third shell 528. Each of the shells 524-528 may have a thickness of $w_s$, and a width $w_3$ of the third substance dispersal device 520 may be equal to a sum of $\text{dimension}_{chamber}$ and 6 $w_s$. Because the second substance dispersal device 510 is wider than the first substance dispersal device 500, the second substance dispersal device 510 may be associated with a longer dissolving time or lower dissolving rate than the first substance dispersal device 500. Similarly, because the third substance dispersal device 520 is wider than the second substance dispersal device 510, the third substance dispersal device 520 may be associated with a longer dissolving time or lower dissolving rate than the second substance dispersal device 510. Although described as having thicknesses of 0.4 mm, in other implementations, the shells 504, 514, 516, 524, 526, and 528 may have thicknesses that are less than 0.4 mm or greater than 0.4 mm. In some implementations, the shells 504, 514, 516, 524, 526, and 528 may be solid, as shown in FIGS. 5A-B. Alternatively, one or more shells may be porous, as further described with reference to FIG. 7.

Although not shown for ease of illustration, any of the substance dispersal devices 500, 510, or 520 may include one or more components of the environmental probe 102 or the environmental probe 200. For example, the substance dispersal devices 500, 510, or 520 may include one or more of a processor, a memory, one or more wireless interfaces, one or more environmental sensors, a GPS receiver, a battery, a solar panel, or one or more visual indicators, as non-limiting examples. The components, when included in the substance dispersal devices 500, 510, or 520, may enable the substance dispersal devices 500, 510, or 520 to perform all, or a subset, of the functionality described above with reference to the environmental probe 102 of FIG. 1 or the environmental probe 200 of FIG. 2. Alternatively, the substance dispersal devices 500, 510, or 520 may not include any electronic components and may not have any smart device functionality. In some implementations, any components included in the substance dispersal devices 500, 510, and 520 may be dissolvable and biodegradable, or extend from the ground after insertion of the substance dispersal devices 500, 510, and 520 for ease of clean up. As a non-limiting example, one or more of the substance dispersal devices 500, 510, or 520 may include a soil moisture sensor and a color changing ink coupled to a rod that extends from the surface of the ground. The soil moisture sensor, the rod, the color changing ink, and any related coupling or components may be dissolvable and biodegradable. The soil moisture sensor may be configured to change a color of the color changing ink based on a detected moisture level in the surrounding soil.

As a non-limiting example, to monitor soil moisture levels of multiple regions, the substance dispersal devices 500, 510, or 520 may be distributed across the multiple regions, and a camera or other image capture device may be configured to capture images of the color changing ink (e.g., visual indicators) of the substance dispersal devices 500, 510, or 520 and provide the images to a hub device (or another device) for processing. Additionally or alternatively, an unmanned aerial vehicle or other drone vehicle may be configured to travel to the various regions and insert the substance dispersal devices 500, 510, or 520 into the ground, and subsequently to travel among the regions to monitor the color changing inks of the various substance dispersal devices and provide such information (e.g., image data or the like) to a hub device (or other device) for processing.

Figure 6:
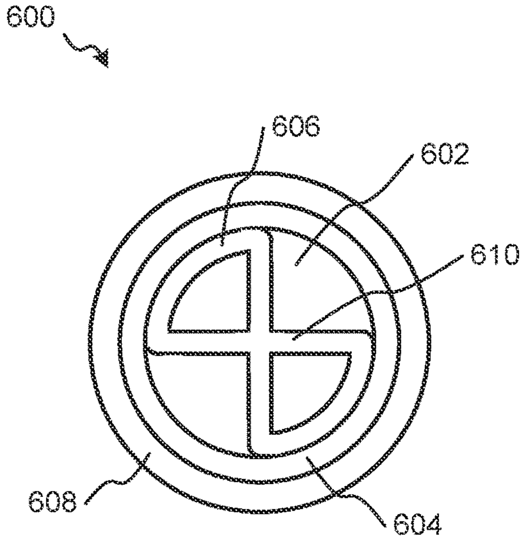
FIG. 6 illustrates a top view of a nose cone of a substance dispersal device according to aspects of the present disclosure.

Referring to FIG. 6, a top-view of an interior of an example of a nose cone of a substance dispersal device according to aspects of the present disclosure is shown as a nose cone 600. In some implementations, the nose cone 600 is included in or corresponds to the substance dispersal device 400 of FIGS. 4A-C or one or more of the substance dispersal devices 500, 510, and 520 of FIGS. 5A-B. In some implementations, the nose cone 600 may have a substantially conical shape. In some other implementations, the nose cone 600 has a substantially pyramidal or substantially prismatic shape, or another shape.

The nose cone 600 includes an interior 602 and three shells: a first shell 604, a second shell 606, and a third shell 608. The shells 604-608 may include or correspond to the shells 524-528 of FIGS. 5A-B. Although three shells 604-608 are shown in other implementations, the nose cone 600 may include fewer three or more than three shells. In some implementations, the nose cone 600 also includes an infill pattern 610. The infill pattern 610 corresponds to portions of the interior 602 that are filled in with materials, such as the same material(s) as the shells 604-608, to strengthen the nose cone 600 and support insertion into denser types of soil (or other insertion locations). For example, the infill pattern 610 may correspond to an infill percentage of 25%, 50%, 75%, or 100%, as non-limiting examples, based on a desired structural strength of the nose cone 600. To further illustrate, some implementations of the nose cone 600 may have an infill percentage of 100% in configurations designed to deliver a substance into very dry and hard soil, while other implementations of the nose cone 600 may have an infill percentage of 50% in configurations designed for less dense environments. Increasing the infill percentage not only increases the structural strength of the nose cone 600, it also increases the dissolving time (e.g., reduces the dissolving rate) associated with the nose cone 600.

Figure 7:
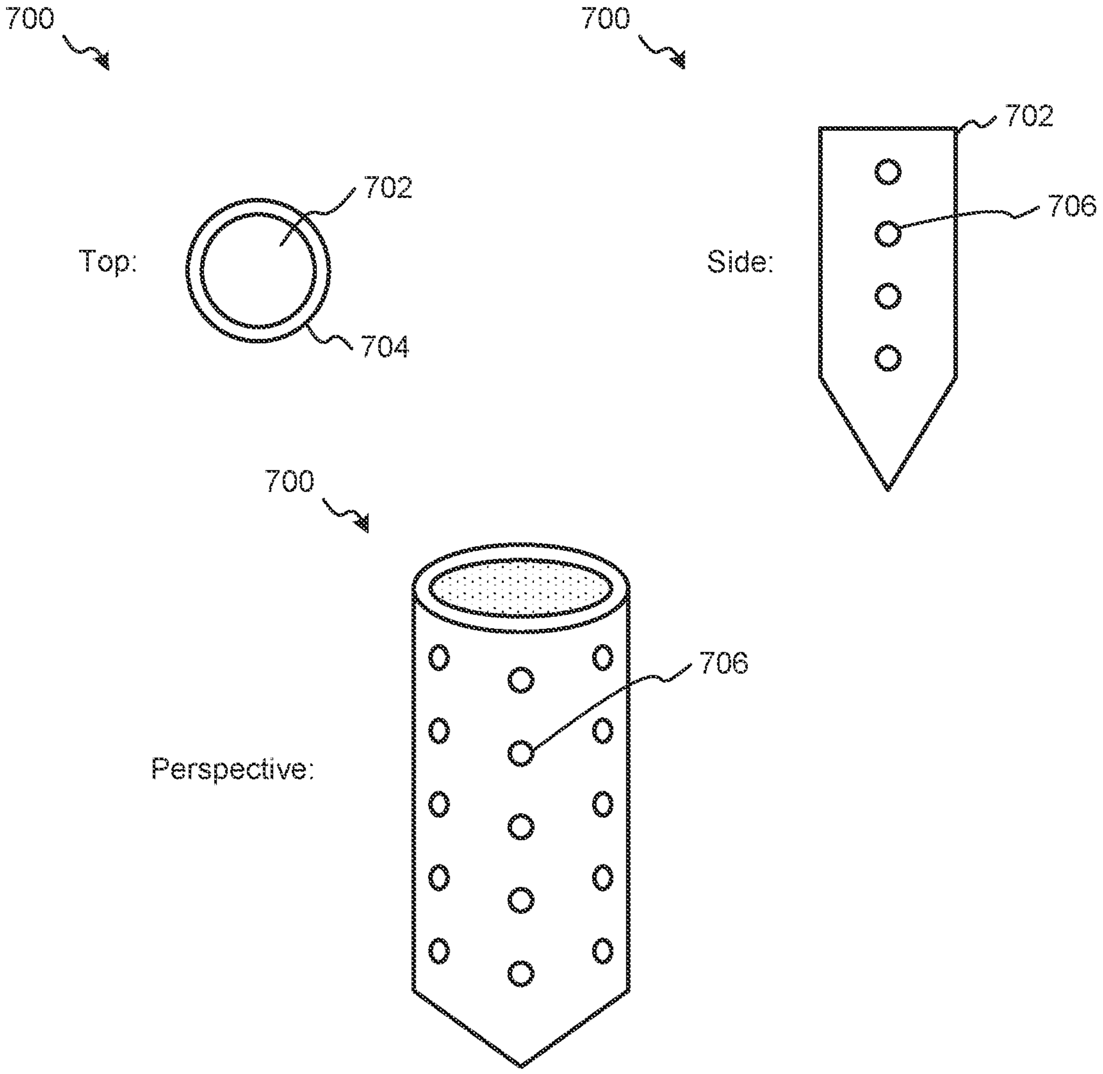
FIG. 7 illustrates top, side, and perspective views of an example of a porous substance dispersal device according to aspects of the present disclosure.

Referring to FIG. 7, top, side, and perspective views of an example of a porous substance dispersal device according to aspects of the present disclosure is shown as a substance dispersal device 700. The substance dispersal device 700 may include or correspond to one or more of the substance dispersal devices 510, 520, and 530 of FIGS. 5A-B. As shown in FIG. 7, the substance dispersal device 700 includes a storage chamber 702 defined by a shell 704. The shell 704 may include or correspond to a wall (e.g., an external or side wall) that defines an interior of the substance dispersal device 700 (e.g., the storage chamber 702). In some implementations, the shell 704 may include or correspond to one or more of the shells 504, 516, and 528 (e.g., the outer shells) of FIGS. 5A-B and may be formed from disposable and biodegradable materials. The shell 704 may be formed by additive manufacturing processes, such as 3D printing, or by other manufacturing processes.

Because the substance dispersal device 700 is porous, the shell 704 may include one or more micro perforations 706 (e.g., one or more small openings, holes, or voids in the shell 704). The micro perforations 706 may be through an entirety of the shell 704 such that the storage chamber 702 is opened to the environment surrounding the substance dispersal device 700. The dissolving rate of the substance dispersal device 700 may be at least partially based on the micro perforations 706. For example, increasing the number or radii of the micro perforations 706 may increase the dissolving rate/decrease the dissolving time of the substance dispersal device 700, while decreasing the number or radii of the micro perforations 706 may decrease the dissolving rate/increase the dissolving time.

Figure 8:
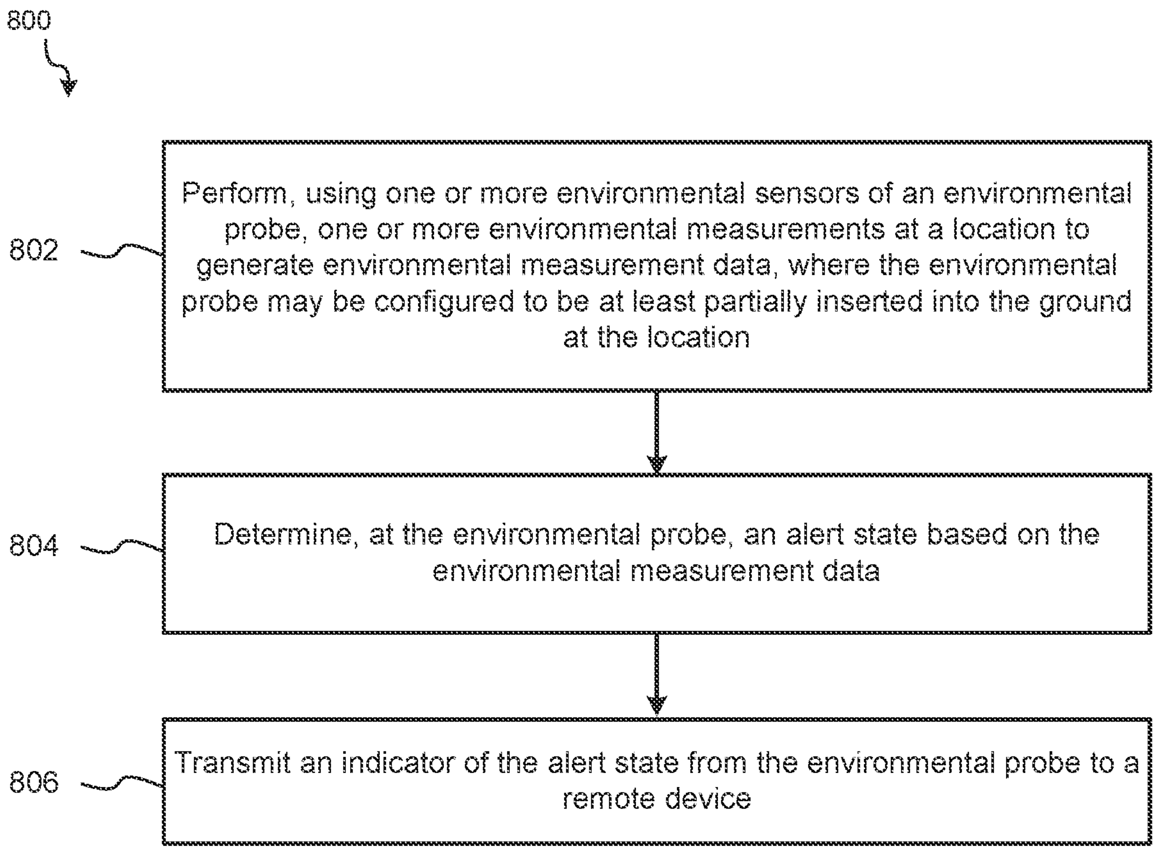
FIG. 8 is a flow diagram illustrating a method for defensible space monitoring according to aspects of the present disclosure.

Referring to FIG. 8, a flow diagram illustrating a method of defensible monitoring according to some aspects of the present disclosure is shown as method 800. In some implementations, the method 800 may be performed by the environmental probe 102 of FIG. 1, the environmental probe 200 of FIG. 2, or one or more of the environmental probes P1-P9 of FIG. 3. Steps of the method 800 may be stored as instructions (e.g., in the memory 106 of the environmental probe 102 of FIG. 1) that, when executed by one or more processors (e.g., the processor 104 of the environmental probe 102 of FIG. 1), cause the one or more processors to perform operations for defensible space monitoring in accordance with the method 800 and the concepts disclosed herein.

The method 800 includes performing, using one or more environmental sensors of an environmental probe, one or more environmental measurements at a location to generate environmental measurement data, at 802. The environmental probe may be configured to be at least partially inserted into the ground at the location. For example, the environmental probe 102 may perform one or more environmental measurements at a location at which the environmental probe 102 is at least partially inserted into the ground using the one or more environmental sensors (e.g., the air temperature sensor 108, the gas sensor 110, the soil surface temperature sensor 112, the soil pH sensor 113, the moisture sensor 114, or a combination thereof).

The method 800 also includes determining, at the environmental probe, an alert state based on the environmental measurement data, at 804. For example, the processor 104 may compare the environmental measurement data to one or more thresholds to determine an alert state, such as an alert indicating detection of a wildfire, detection of a dry condition, detection of an over-watered condition, or detection of another condition associated with the location.

The method 800 further includes transmitting an indicator of the alert state from the environmental probe to a remote device, at 806. For example, the environmental probe 102 may transmit, via the one or more wireless interfaces 116, an indicator of the alert state to the smart device hub 140, the mobile device 150, or another remote device. In other implementations, the environmental measurement data may be transmitted to the remote device (e.g., the smart hub device, a server of a fire department or other government entity, a server of an insurance company, an environmental probe hub device, or the like), and the alert state may be determined by the remote device based on the environmental measurement data (and environmental measurement data from other nearby environmental probes). It is noted that other types of devices and functionality may be provided according to aspects of the present disclosure and discussion of specific devices and functionality herein have been provided for purposes of illustration, rather than by way of limitation. It is also noted that the method 800 may also include other functionality or steps consistent with the description of the operations of the system 100 of FIG. 1, the environmental probe 200 of FIG. 2, and/or the system 300 of FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-8) may comprise processors, electronics devices, hardware devices, electronics components, logical circuits, memories, software codes, firmware codes, etc., or any combination thereof. In addition, features discussed herein relating to FIGS. 1-8 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An environmental probe configured to be at least partially inserted into the ground at a location, the environmental probe comprising:

a nose cone configured to enable insertion of the environmental probe into the ground at the location, the nose cone comprising one or more dissolvable walls configured to dissolve to cause dispersal of a substance stored within the environmental probe at the location;

one or more environmental sensors configured to generate environmental measurement data indicating one or more environmental measurements at the location;

one or more wireless communication interfaces;

a memory; and a processor coupled to the memory, the one or more wireless communication interfaces, and the one or more environmental sensors, wherein the processor is configured to initiate transmission, to a remote device via the one or more wireless communication interfaces, of the environmental measurement data.

2. The environmental probe of claim 1, wherein the nose cone is detachable.

3. The environmental probe of claim 1, further comprising a storage chamber configured to store the substance for dispersal at the location.

4. The environmental probe of claim 3, wherein one or more outer walls that define the storage chamber comprise one or more additional dissolvable walls configured to dissolve to cause dispersal of the substance at the location.

5. The environmental probe of claim 4, wherein the one or more additional dissolvable walls and the nose cone are formed entirely of biodegradable materials.

6. The environmental probe of claim 3, wherein the substance comprises weedicide, soil nutrients, insect pathogenic nematodes, water retaining hydrogels, or a combination thereof.

7. The environmental probe of claim 1, further comprising a solar panel configured to power the one or more environmental sensors, the one or more wireless communication interfaces, the memory, the processor, or a combination thereof.

8. The environmental probe of claim 1, further comprising a removable battery configured to power the one or more environmental sensors, the one or more wireless communication interfaces, the memory, the processor, or a combination thereof.

9. The environmental probe of claim 1, further comprising a visual indicator configured to indicate an alert state based on the environmental measurement data, an error state associated with the environmental probe, or a combination thereof.

10. The environmental probe of claim 1, wherein the processor is further configured to receive additional environmental measurement data from one or more additional environmental probes via the one or more wireless communication interfaces.

11. A method comprising:

performing, using one or more environmental sensors of an environmental probe, one or more environmental measurements at a location to generate environmental measurement data, wherein the environmental probe comprises a nose cone configured to enable insertion of the environmental probe at least partially into the ground at the location, the nose cone comprising one or more dissolvable walls configured to dissolve to cause dispersal of a substance stored within the environmental probe at the location; and transmitting the environmental measurement data to a remote device.

12. The method of claim 11, further comprising:

comparing the environmental measurement data to a gas level threshold, a particle level threshold, an air temperature increase rate threshold, a soil temperature increase rate threshold, a soil pH level threshold, a moisture threshold, or a combination thereof; and determining that an alert state exists based on the environmental measurement data satisfying the gas level threshold, the particle level threshold, the air temperature increase rate threshold, the soil temperature increase rate threshold, the soil pH level threshold, the moisture threshold, or a combination thereof.

13. The method of claim 11, wherein:

the one or more environmental sensors comprise an air temperature sensor, a gas sensor, or both, and the environmental measurement data indicates an air temperature at the location, one or more gasses or particulates detected at the location, or both.

14. The method of claim 11, wherein:

the one or more environmental sensors comprise a soil surface temperature sensor, a moisture sensor, a soil pH sensor, or a combination thereof, and the environmental measurement data indicates a soil temperature at the location, a soil pH level at the location, a moisture level of soil at the location, or a combination thereof.

15. An environmental probe configured to be at least partially inserted into the ground at a location, the environmental probe comprising:

a storage chamber configured to store a substance for dispersal at the location, wherein the storage chamber is surrounded by and defined by one or more dissolvable outer walls of the environmental probe, the one or more dissolvable outer walls configured to cause dispersal of the substance;

one or more environmental sensors configured to generate environmental measurement data indicating one or more environmental measurements at the location;

one or more wireless communication interfaces;

a memory; and a processor coupled to the memory, the one or more wireless communication interfaces, and the one or more environmental sensors, wherein the processor is configured to initiate transmission, to a remote device via the one or more wireless communication interfaces, of the environmental measurement data.

16. The environmental probe of claim 15, wherein the one or more dissolvable outer walls are formed entirely of biodegradable materials.

17. The environmental probe of claim 15, further comprising a detachable nose cone configured to enable insertion of the environmental probe into the ground at the location.

18. The environmental probe of claim 15, wherein the substance comprises weedicide, soil nutrients, insect pathogenic nematodes, water retaining hydrogels, or a combination thereof.

19. The environmental probe of claim 15, further comprising a color changing indicator that is configured to extend above the ground at the location and to exhibit a selected color from a plurality of colors based on the environmental measurement data.

20. The environmental probe of claim 15, wherein the environmental measurement data indicates an air temperature at the location, one or more gasses or particulates detected at the location, a soil temperature at the location, a soil pH level at the location, a moisture level of soil at the location, or a combination thereof.

* * * * *